(12) United States Patent
Hundemer

(10) Patent No.: US 10,003,835 B2
(45) Date of Patent: Jun. 19, 2018

(54) DEVICE CONTROL IN BACKUP MEDIA-BROADCAST SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

(21) Appl. No.: 14/748,531

(22) Filed: Jun. 24, 2015

(65) Prior Publication Data

US 2016/0381403 A1    Dec. 29, 2016

(51) Int. Cl.
| | |
|---|---|
| *H04N 7/173* | (2011.01) |
| *H04N 21/24* | (2011.01) |
| *H04N 21/218* | (2011.01) |
| *H04N 21/462* | (2011.01) |

(52) U.S. Cl.
CPC ..... *H04N 21/2404* (2013.01); *H04N 21/2181* (2013.01); *H04N 21/4622* (2013.01)

(58) Field of Classification Search
CPC combination set(s) only.
See application file for complete search history.

(56) References Cited

U.S. PATENT DOCUMENTS

| | | | |
|---|---|---|---|
| 6,378,129 B1 * | 4/2002 | Zetts | H04L 29/06027 348/E5.008 |
| 6,901,604 B1 * | 5/2005 | Kiraly | G08B 27/005 709/213 |
| 7,099,661 B1 * | 8/2006 | Longbottom | G06F 11/2023 370/250 |

(Continued)

FOREIGN PATENT DOCUMENTS

| | | |
|---|---|---|
| KR | 1020110044611 A | 4/2011 |
| WO | 199949663 A1 | 9/1999 |
| WO | 200197030 A1 | 12/2001 |

OTHER PUBLICATIONS

Flavio P. Junqueira et al., Zab: High Performance broadcast for primary-backup systems, IEEE/IFIP 41st International Conference on Dependable Systems & Networks, Jun. 27, 2011, pp. 245-256.

(Continued)

*Primary Examiner* — Alexander Gee
(74) *Attorney, Agent, or Firm* — McDonnell Boehnen Hulbert & Berghoff LLP

(57) ABSTRACT

In one aspect, an example method may be used in connection with a system including a first media-broadcast system (MBS) and a second MBS, wherein the first MBS includes a first automation-system and a first device, wherein the first automation-system transmits, to the first device, a first instruction configured to control operation of the first device, and wherein the second MBS includes a second automation-system and a second device. The method includes: receiving, by a computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

20 Claims, 4 Drawing Sheets

(56) References Cited

U.S. PATENT DOCUMENTS

| | | | |
|---|---|---|---|
| 7,991,883 B1* | 8/2011 | Streeter | H04L 67/06 709/203 |
| 8,595,377 B1* | 11/2013 | Apgar | H04N 7/181 348/143 |
| 2004/0215669 A1 | 10/2004 | Mettala et al. | |
| 2004/0247205 A1* | 12/2004 | Nagaya | H04N 5/76 382/305 |
| 2007/0006270 A1* | 1/2007 | Frigui | H04L 29/06027 725/93 |
| 2007/0245392 A1* | 10/2007 | Shen | H04N 21/23116 725/115 |
| 2010/0017532 A1* | 1/2010 | Bowen | H04N 7/165 709/231 |
| 2011/0138411 A1* | 6/2011 | Koontz, III | H04H 20/18 725/32 |
| 2011/0219019 A1* | 9/2011 | Peng | G06F 15/16 707/769 |
| 2012/0166865 A1* | 6/2012 | Liu | H04H 20/82 714/4.11 |
| 2013/0250755 A1* | 9/2013 | Clark | H04L 69/40 370/228 |
| 2013/0254823 A1* | 9/2013 | Tsuji | H04N 21/21 725/116 |
| 2014/0040972 A1* | 2/2014 | Sorlander | H04N 21/23614 725/127 |
| 2014/0066189 A1* | 3/2014 | Brooks | G07F 17/3288 463/28 |
| 2014/0304756 A1* | 10/2014 | Fletcher | H04N 21/2387 725/115 |

OTHER PUBLICATIONS

Written Opinion of the International Searching Authority dated Sep. 22, 2016 issued in connection with International Application No. PCT/US2016/037779, filed on Jun. 16, 2016, 5 pages.

International Search Report dated Sep. 22, 2016 issued in connection with International Application No. PCT/US2016/037779, filed on Jun. 16, 2016, 4 pages.

* cited by examiner

DEVICE CONTROL IN BACKUP MEDIA-BROADCAST SYSTEM

USAGE AND TERMINOLOGY

Throughout this disclosure, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A media-broadcast system (MBS) may be configured to generate and broadcast a media stream to an end-user device (e.g., a television set-top box) for presentation to an end-user.

For a variety of reasons, an MBS may not operate properly. In view of this, it may be desired to have two different MBSs capable of operating in the same or similar manners. With this redundancy-type arrangement, if a first (i.e., primary) MBS stops operating properly, a second (i.e., backup) MBS may take over and operate in place of the first MBS.

SUMMARY

In a first aspect, an example method may be used in connection with a system including a first MBS and a second MBS, wherein the first MBS includes a first automation-system and a first device, wherein the first automation-system transmits, to the first device, a first instruction configured to control operation of the first device, and wherein the second MBS includes a second automation-system and a second device. The method includes: receiving, by a computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

In a second aspect, a non-transitory computer-readable medium has stored thereon program instructions that when executed cause a computing device to perform a set of acts for use in connection with a system. The system includes a first MBS and a second MBS, wherein the first MBS includes a first automation-system and a first device, wherein the first automation-system transmits, to the first device, a first instruction configured to control operation of the first device, and wherein the second MBS includes a second automation-system and a second device. The set of acts includes: receiving, by the computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

In a third aspect, an example method may be used in connection with a system including a first MBS and a second MBS, wherein the first MBS includes a first automation-system and a first device, wherein the first automation-system transmits, to the first device, a first instruction configured to control operation of the first device, and wherein the second MBS includes a second device. The method includes receiving, by a computing device, from the first automation-system, the first instruction; and responsive to receiving the first instruction, transmitting, by the computing device, to the second device, the first instruction, thereby controlling operation of the second device.

In a fourth aspect, a non-transitory computer-readable medium has stored thereon program instructions that when executed cause a computing device to perform a set of acts for use in connection with a system. The system includes a first MBS and a second MBS, wherein the first MBS includes a first automation-system and a first device, wherein the first automation-system transmits, to the first device, a first instruction configured to control operation of the first device, and wherein the second MBS includes a second device. The set of acts includes receiving, by a computing device, from the first automation-system, the first instruction; and responsive to receiving the first instruction, transmitting, by the computing device, to the second device, the first instruction, thereby controlling operation of the second device.

DETAILED DESCRIPTION

I. Overview

Figure 1:
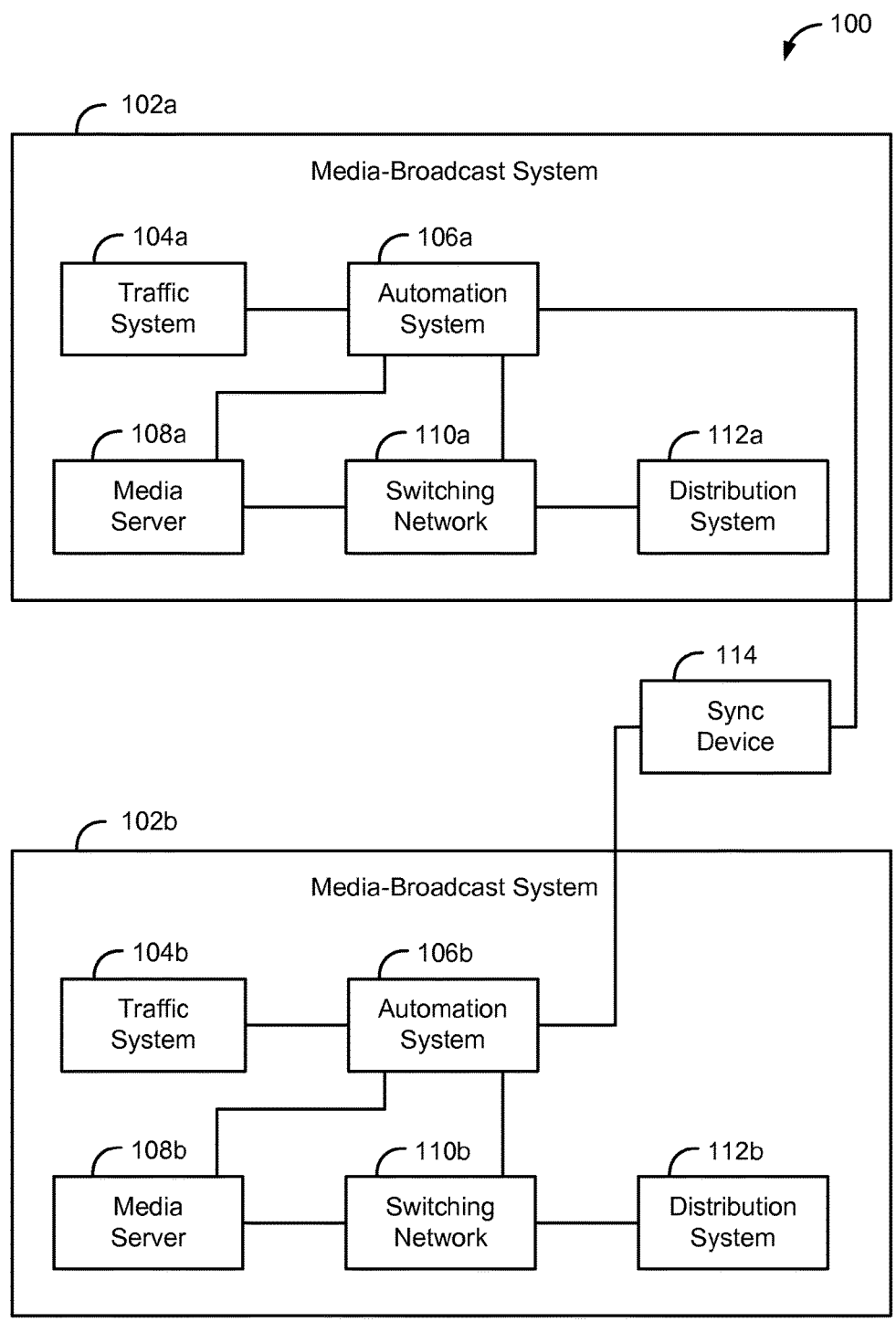
FIG. 1 is a simplified block diagram illustrating an example system.

As indicated above, in a redundancy-type arrangement, if a first MBS stops operating properly, a second MBS may take over and operate in place of the first MBS. However, before the second MBS can do this, the second MBS may need to boot-up or initialize, which may take up to a few minutes or more. This may result in neither MBS being able to operate properly during that time period.

To help avoid this problem, in an alternative arrangement, the second MBS may operate largely in tandem with the first MBS before the first MBS stops operating properly. This may allow the second MBS to take over for and operate in place of the first MBS at any given moment, as needed.

An MBS may include one or more systems or devices, including for example an automation system and a media server. The automation system may perform operations in accordance with a traffic schedule. For example, where a record of the traffic schedule indicates that a media asset is scheduled to start being broadcast at a particular time, the automation system may cause the media server to, before the scheduled start time, retrieve a file representing the media asset. This is sometimes referred to as loading a media asset. Further, based on the record, the automation system may cause the media server to use the file to start generating a media stream proximate the scheduled start time. This is sometimes referred to as playing out a media asset. This may allow the MBS to, proximate the scheduled start time, start broadcasting the media stream representing the media asset. To allow the automation system to control the media server or any other device in such a time-sensitive manner, the automation system may synchronize itself with a time clock.

As noted above, in one arrangement, a second MBS may operate largely in tandem with a first MBS before the first MBS stops operating properly. As such, before the second MBS takes over for and operates in place of the first MBS, the second automation-system (i.e., the automation system of the second MBS) may synchronize with a time clock.

The process of synchronizing with a time clock may be complex and potentially error prone. Thus, it may be desirable to provide a redundant MBS setup where a second MBS may operate largely in tandem with a first MBS, but where the second MBS does not need to be synchronized with a time clock before the second MBS takes over for and operates in place of the first MBS. The present disclosure provides such a setup.

In one aspect, the present disclosure includes a method for use in a system including a first MBS and a second MBS, wherein the first MBS includes a first automation-system and a first device, wherein the first automation-system transmits, to the first device, a first instruction configured to control operation of the first device, and wherein the second MBS includes a second automation-system and a second device. The method includes: receiving, by a computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

Provided that the hardware arrangements of the first and second MBSs are similar enough, the computing device may use the output of the first automation-system as a basis to control the second MBS. This may allow the second MBS to operate largely in tandem with the first MBS before the second MBS takes over for and operates in place of the first MBS, without the need for the second MBS to be synchronized with a time clock. This setup may provide other benefits as well.

II. Example System

FIG. 1 is a simplified block diagram illustrating an example system 100. The system 100 may include an MBS 102a and an MBS 102b. In one example, the MBS 102a may serve as a primary MBS and the MBS 102b may serve as a backup MBS.

The MBS 102a may be configured to generate and/or distribute a media stream to an end-user device for presentation to end-user. In practice, the MBS 102 may generate and distribute a media stream to a mass number of end-user devices for presentation to a mass number of end-users. The MBS 102a may take a variety of forms, such as that of a television-broadcast system or a radio-broadcast system.

The MBS 102a may include one or more systems, devices, or networks, including for example, a traffic system 104a, an automation system 106a, a media server 108a, a switching network 110a, and a distribution system 112a.

The systems, devices, and networks of the MBS 102a may be connected, directly or indirectly, in various ways. For example, the traffic system 104a may be connected to the automation system 106a. The automation system 106a may be connected to the media server 108a and to one or more systems or devices of the switching network 110a. The media server 108a may be connected to one or more systems or devices of the switching network 110a. And one or more systems or devices of the switching network 110a may be connected to the distribution system 112a.

The traffic system 104a may be configured to perform operations related to broadcast scheduling. For example, the traffic system may be configured to facilitate the creation and modification of a traffic schedule, and to transmit the traffic schedule to the automation system 106a. A traffic schedule is a schedule of broadcast-related events, typically for a particular channel or station. A traffic schedule is sometimes referred to as a traffic log.

An example of the traffic system 104a is Wide Orbit Traffic provided by Wide Orbit Inc. of San Francisco, Calif.

The automation system 106a may be configured to perform operations related to broadcast scheduling and sequencing. For example, the automation system 106a may be configured to receive the traffic schedule from the traffic system 104a, and to modify the traffic schedule, such as by adding information to it. For example, where a record of the traffic schedule indicates that a particular media asset has been scheduled, the automation system 106a may add to that record an indication of a particular media server assigned to load and playout that media asset. In practice, the automation system 106a may modify multiple records of the traffic schedule in this manner. A traffic schedule that has been modified with this additional information is sometimes referred to as a playlist.

The automation system 106a may also be configured to control one or more systems or devices of the MBS 102a, perhaps based on a traffic schedule. This is described in greater detail below.

In some cases, the automation system 106a may have one or more functional components responsible for carrying out certain types of operations. For example, the automation system 106a may include a media controller that is responsible for controlling systems and devices that load, playout, and/or channel media assets.

The media server 108a may be configured to load a media asset. This may involve the media server 108a retrieving from a data storage unit a file representing the media asset. The media server 108a may also be configured to playout the media asset. This may involve the media server 108a converting a retrieved file into a media stream and outputting the media stream. This may allow the media server 108a to transmit the media stream to another system or device, such as one in the switching network 110a.

An example of the media server 108a is the K2 Media Server provided by Grass Valley of San Francisco, Calif.

The switching network 110a may be configured to map one or more source devices to one or more destination devices. For example, where the MBS 108a includes multiple media servers 108a, the switching network 110a may be configured to map one or more of the multiple media servers 108 to the distribution system 112b. This may allow a particular media server 108a to transmit a media stream to the distribution system 112a. To provide such functionality, the switching network 110a may include one or more networking devices, such as routers or switchers, which have modifiable input-to-output mapping settings. By modifying these input-to-output mapping settings, the automation system 106a may control the path of a given media stream. In some instances, a networking device of the switching network 110a may modify media content represented by a media stream, such as through application of a digital video-effect (DVE). The automation system 106a may control this application of a DVE.

The distribution system 112a may be configured to distribute a media stream to an end-user device for presentation to an end-user. In practice, the distribution system 112a may distribute a media stream to a mass number of end-user devices for presentation to a mass number of end-users. The distribution system 112a may include various systems or components, such as a terrestrial antenna or a satellite, and may be configured for distributing the media stream to the end-user device in a variety of ways. For example, the distribution device 112a may distribute the media stream over-the-air or via a packet-based network such as the Internet.

The end-user device may take a variety of forms, such as that of a television, a television set-top box, a radio, or a computing device. As used throughout this disclosure, the term broadcast means the distribution of media (e.g., audio, video, or a combination thereof) via any means.

The MBS 102a may include various other devices as well. As noted above, the automation system 106a may be configured to control a device of the MBS 102a, perhaps based on the traffic schedule. In one example, the automation system 106a may traverse records of the traffic schedule, and control devices based on the entries in those traversed records.

The automation system 106a may control various types of devices, such as the media server 108a or a networking device of the switching network 110b as described above. The automation system 106a may control a device by transmitting a suitable instruction to the device. In some instances, the automation system 106a may use a mapping table to map a desired operation to a corresponding instruction.

To illustrate this, where a record of the traffic schedule indicates that a media asset is scheduled to start being broadcast at a particular time, the automation system 106a may, before the scheduled start time, transmit to the media server 108a an instruction that causes the media server 108a to load the media asset. Further, based on the record, the automation system 106a may, proximate the scheduled start time, transmit to the media server 108a an instruction that causes the media server 108a to playout the media asset. At or about the same time, the automation system 106a may also transmit to a networking device in the switching network 110a, an instruction that causes the networking device to modify its input-to-output mapping setting to allow the generated media stream to be channeled through the switching network 110a and to the distribution system 112a. This may allow the MBS 102a to, proximate the scheduled start time, start broadcasting the media stream. The automation system 106a may control these and other types of devices in various other ways. As one additional example, the automation system 106a may cause a device to execute a DVE.

In addition to transmitting an instruction to a device in the MBS 102a, the automation system 106a may also transmit the instruction to the synchronization device 114 to facilitated synchronized operation of the MBS 102b. This is described in greater detail below.

The MBS 102b may be configured in a same or similar manner to that of the MBS 102a. As such, the MBS 102b may include a traffic system 104b, an automation system 106b, a media server 108b, a switching network 108b, and a distribution system 112b. The MBS 102b may include various other devices as well. In one example, the MBS 102b may be an exact replica of the MBS 102a. As such, the MBS 102a and the MBS 102b may have the same systems and devices, with the same model numbers, and in the same arrangement.

The system 100 may also include a synchronization device 114, which is connected to the automation system 106a and to the automation system 106b. In one example, the synchronization device 114 may be part of the MBS 102a. In another example, the synchronization device 114 may be part of the MBS 102b.

The synchronization device 114 may be configured for synchronizing select operations occurring in connection with the MBS 102a and the MBS 102b. As noted above, the automation system 106a may transmit an instruction to a device of the MBS 102a to control the device, and may also transmit the instruction to the synchronization device 114. As such, the synchronization device 114 may be configured to receive a first instruction.

The synchronization device 114 may further be configured such that in response to receiving the first instruction, the synchronization device 114 transmits to the automation system 106b, a second instruction configured to cause the automation system 106b to transmit to a second device of the MBS 102b, the first instruction, thereby controlling operation of the second device.

The first device may be any device of the MBS 102a. Likewise, the second device may be any corresponding device of the MBS 102b. For example, where the automation system 106a transmits to the media server 108a, an instruction that causes the media server 108a to load a media asset, the automation system 106a may transmit the first instruction to the synchronization device 114, and the synchronization device 114 may receive the same. In response to receiving the first instruction, the synchronization device 114 may transmit to the automation system 106b, a second instruction that causes the automation system 106b to transmit the first instruction to the media server 108b, thereby causing the media server 108b to load the same media asset.

In practice, provided that the hardware arrangements of the MBS 102a and the MBS 102b are similar enough, the synchronization device 114 may use the output of the automation system 106a as a basis to control the MBS 102b. This may allow the MBS 102b to operate largely in tandem with the MBS 102a before the MBS 102b stops operating properly, and without the need for the MBS 102b to be synchronized with a time clock.

This setup may be particularly useful in cases where a primary MBS performs an operation that does not rely on a traffic schedule for cueing. Such an operation may include, for example, a rolling of a commercial break during the broadcast of a live-program media stream, where the rolling event is triggered by a human actuating a trigger mechanism. Since this type of operation does not rely on a traffic schedule for cueing, a traditional backup MBS may not properly mirror this operation of the primary MBS. However, with the present setup, since the synchronization device 114 may use the output of the automation system 106a as a basis to control the MBS 102b, the MBS 102b may more easily mirror such an operation. The present is setup may provide other benefits as well.

In an alternative configuration, the synchronization device 114 may be configured such that in response to receiving the first instruction, the synchronization device 114 transmits to the second device of the MBS 102b, the first instruction, thereby controlling operation of the second device directly (i.e., without relying on the automation system 106b to control the second device).

Figure 2:
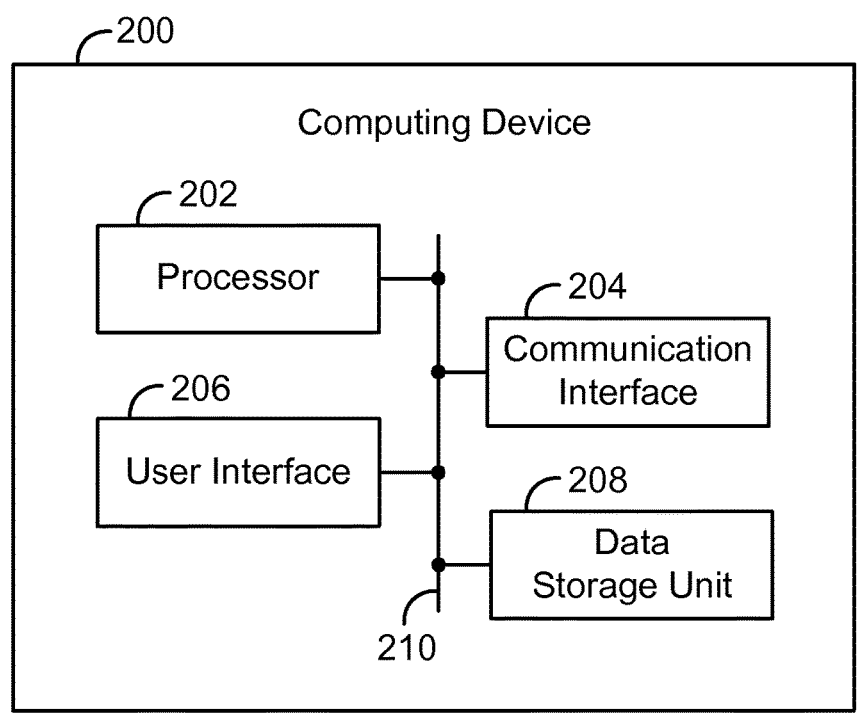
FIG. 2 is a simplified block diagram illustrating an example computing device.

FIG. 2 is a simplified block diagram illustrating an example computing device 200. The device 200 may represent any of the systems or devices described in connection in connection with the system 100, such as the synchronization device 114. The device 200 may be configured for performing a variety of functions or acts, such as those described in this disclosure (including the accompanying drawings). The device 200 may include various components, including for example, a processor 202, a communication interface 204, a user interface 206, and a data storage unit 208. The components of the device 200 may be communicatively connected to each other (or other devices or systems) via a system bus, network, or other connection mechanism 210.

The processor 202 may include a general purpose processor (e.g., a microprocessor) and/or a special purpose processor (e.g., a digital signal processor (DSP)).

The communication interface 204 may be configured to allow the device 300 to communicate with one or more systems or devices according to one or more protocols. In one example, the communication interface 204 may be a wired interface, such as an Ethernet interface or a high-definition serial-digital-interface (HD-SDI). As another example, the communication interface 204 may be a wireless interface, such as a cellular or WI-FI interface.

The user interface 206 may facilitate interaction with a user of the device, if applicable. As such, the user interface 206 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage unit 208 may include one or more volatile, non-volatile, removable, and/or non-removable storage components, such as magnetic, optical, or flash storage, and may be integrated in whole or in part with the processor 202. Further, the data storage unit 208 may take the form of a non-transitory computer-readable storage medium, having stored thereon program instructions (e.g., compiled or non-compiled program logic and/or machine code) that, when executed by the processor 202, cause the device 200 to perform one or more functions or acts, such as those described in this disclosure. Such program instructions may define or be part of a discrete software application that can be executed in response to certain inputs received from the user interface 206, for instance. The data storage unit 208 may also store other types of information or data, such as those types described throughout this disclosure.

III. Example Operations

Figure 3:
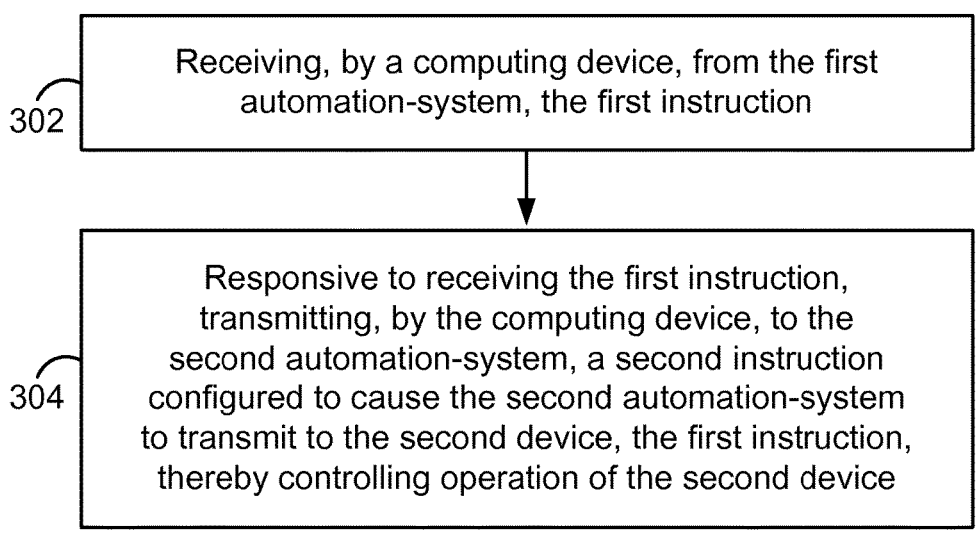
FIG. 3 is a flow chart illustrating an example method.

FIG. 3 is a flow chart illustrating an example method 300. The method 300 may be used in connection with a system including a first MBS and a second MBS, wherein the first MBS includes a first automation-system and a first device, wherein the first automation-system transmits, to the first device, a first instruction configured to control operation of the first device, and wherein the second MBS includes a second automation-system and a second device. In one example, the method 300 may be used in connection with the system 100.

At block 302, the method may include receiving, by a computing device, from the first automation-system, the first instruction.

At block 304, the method may include responsive to receiving the first instruction, transmitting, by the computing device, to the second automation-system, a second instruction configured to cause the second automation-system to transmit to the second device, the first instruction, thereby controlling operation of the second device.

Figure 4:
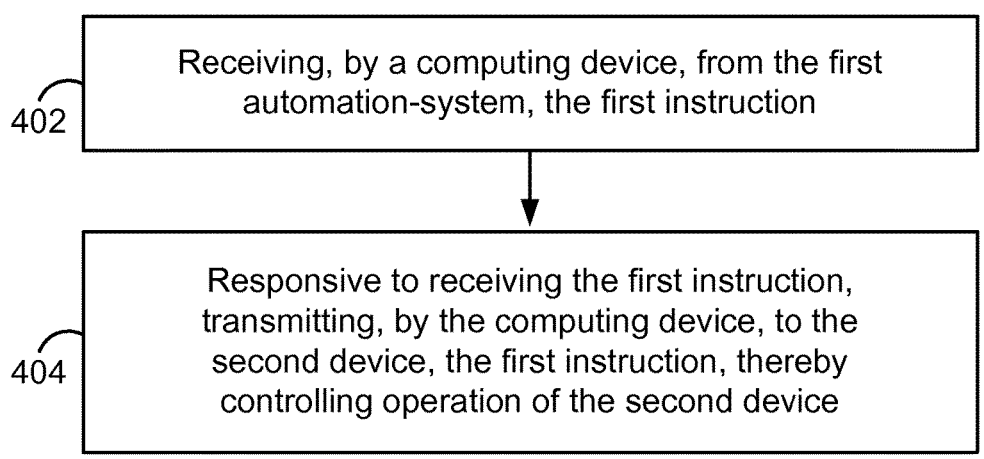
FIG. 4 is a flow chart illustrating another example method.

FIG. 4 is a flow chart illustrating an example method 400. The method 400 may be used in connection with a system including a first MBS and a second MBS, wherein the first MBS includes a first automation-system and a first device, wherein the first automation-system transmits, to the first device, a first instruction configured to control operation of the first device, and wherein the second MBS includes a second device. In one example, the method 400 may be used in connection with the system 100.

At block 402, the method may include receiving, by a computing device, from the first automation-system, the first instruction.

At block 404, the method may involve responsive to receiving the first instruction, transmitting, by the computing device, to the second device, the first instruction, thereby controlling operation of the second device.

IV. Example Variations

While one or more acts may have been described as being performed by one or more systems or devices, the acts may be performed by any system or device, such as those described in connection with the system 100. Furthermore, the devices and systems need not be discrete entities. Some or all of the systems or devices may be combined in a single system or device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one disclosed example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

The invention claimed is:

1. A method for use in connection with a system comprising a first media-broadcast system (MBS) and a second MBS, wherein the first MBS comprises a first media-server, a first automation-system, a first device, and a traffic system, wherein the first automation-system transmits, to the first device, a first instruction configured to control operation of the first device, and wherein the second MBS comprises a second media-server, a second automation-system and a second device, wherein each of the first media-server and the second media-server is configured for operating independently of the other media server, the method comprising:

receiving, by a computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

2. The method of claim 1, wherein the first automation-system comprises a first media-controller, and wherein the second automation-system comprises a second media-controller.

3. The method of claim 1, wherein a first model-identifier of the first device is identical to a second model-identifier of the second device.

4. The method of claim 1, wherein the first device comprises the first media-server, and wherein the second device comprises the second media-server.

5. The method of claim 4, wherein the first instruction is configured to cause the first media-server to load a media asset.

6. The method of claim 4, wherein the first instruction is configured to cause the first media-server to playout a media asset.

7. The method of claim 1, wherein the first device comprises a first networking-device and the second device comprises a second networking-device.

8. The method of claim 7, wherein the first instruction is configured to cause the first networking-device to modify an input-to-output mapping setting of the first networking-device.

9. A non-transitory computer-readable medium having stored thereon program instructions that when executed cause a computing device to perform a set of acts for use in connection with a system comprising a first media-broadcast system (MBS) and a second MBS, wherein the first MBS comprises a first media-server, a first automation-system, a first device, and a traffic system, wherein the first automation-system transmits, to the first device, a first instruction configured to control operation of the first device, and wherein the second MBS comprises a second media-server, a second automation-system and a second device, wherein each of the first media-server and the second media-server is configured for operating independently of the other media server, the set of acts comprising:

receiving, by the computing device, from the first automation-system, the first instruction; and responsive to receiving the first instruction, transmitting, by the computing device, to the second automation-system, a second instruction configured to cause the second automation-system to transmit to the second device, the first instruction, thereby controlling operation of the second device.

10. The non-transitory computer-readable medium of claim 9, wherein the first automation-system comprises a first media-controller, and wherein the second automation-system comprises a second media-controller.

11. The non-transitory computer-readable medium of claim 9, wherein a first model-identifier of the first device is identical to a second model-identifier of the second device.

12. The non-transitory computer-readable medium of claim 9, wherein the first device comprises the first media-server, and wherein the second device comprises the second media-server.

13. The non-transitory computer-readable medium of claim 12, wherein the first instruction is configured to cause the first media-server to load a media asset.

14. The non-transitory computer-readable medium of claim 12, wherein the first instruction is configured to cause the first media-server to playout a media asset.

15. The non-transitory computer-readable medium of claim 9, wherein the first device comprises a first networking-device, and wherein the second device comprises a second networking-device.

16. The non-transitory computer-readable medium of claim 15, wherein the first instruction is configured to cause the first networking-device to modify an input-to-output mapping setting of the first networking-device.

17. A method for use in connection with a system comprising a first media-broadcast system (MBS) and a second MBS, wherein the first MBS comprises a first media-server a first automation-system, a first device, and a traffic system, wherein the first automation-system transmits, to the first device, a first instruction configured to control operation of the first device, and wherein the second MBS comprises a second media-server, a second device, wherein each of the first media-server and the second media-server is configured for operating independently of the other media server, the method comprising:

receiving, by a computing device, from the first automation-system, the first instruction; and responsive to receiving the first instruction, transmitting, by the computing device, to the second device, the first instruction, thereby controlling operation of the second device.

18. The method of claim 17, wherein a first model-identifier of the first device is identical to a second model-identifier of the second device.

19. The method of claim 17, wherein the first device comprises a first networking-device, and wherein the second device comprises a second networking-device.

20. The method of claim 19, wherein the first instruction is configured to cause the first networking-device to modify an input-to-output mapping setting of the first networking-device.

* * * * *